March 9, 1954     E. D. MEADOWS     2,671,702

SPINDLE BEARING

Filed March 29, 1949

INVENTOR.
ERNEST D. MEADOWS
BY
*Mitchell Bechert*
ATTORNEYS

Patented Mar. 9, 1954

2,671,702

UNITED STATES PATENT OFFICE 2,671,702

SPINDLE BEARING

Ernest D. Meadows, Atlanta, Ga., assignor to Meadows Manufacturing Company, Atlanta, Ga., a corporation of Georgia Application March 29, 1949, Serial No. 84,131

1 Claim. (Cl. 308—156)

My invention relates to a spindle mounting, and in particular to an improved mounting for a textile spindle.

It is an object of the invention to provide an improved spindle-bearing construction.

It is another object to provide an improved self-aligning bearing suspension for a spindle, wherein the degree of self-alignment is limited in order to protect the bearing.

It is also an object to provide an improved spindle suspension wherein self-aligning bearing means may be employed in conjunction with means resiliently urging the spindle toward a given alignment, within the limit of self-alignment of said bearing means.

It is a more specific object to provide an improved spindle-bearing suspension which may adapt itself, within limits, to misaligned rotation when slight eccentric loads on the spindle dictate such misaligned rotation.

Other objects and various further features of the invention will be pointed out or will occur to those skilled in the art from a reading of the following specification in conjunction with the accompanying drawings. In said drawings, which show, for illustrative purposes only, preferred forms of the invention:

Briefly stated, my invention, in a preferred form, contemplates a bearing suspension for a vertically mounted spindle wherein a part of the spindle may be supported by a bearing having self-aligning characteristics, and wherein means engaging said spindle and spaced from said first bearing may have limited radial freedom so as to permit a certain amount of misaligned rotation of the spindle within the first bearing, the limited radial freedom being such as to permit spindle-axis tilting within the tolerable self-alignment limits of said bearing. The bearing may sustain the principal radial load at an intermediate part of the spindle, and the said bearing may be carried at the upper end of a bolster; and the means which limits the self-alignment may be a floating step bearing supporting the lower end of the spindle. Resilient means may normally urge the step bearing to a central position, thus resiliently opposing misalignment displacements, and means may be incorporated in the mounting of the step bearing to assure that such radial freedom or floating as is permitted the step bearing shall not exceed the misalignment capabilities of the upper or main bearing.

Figure 1:
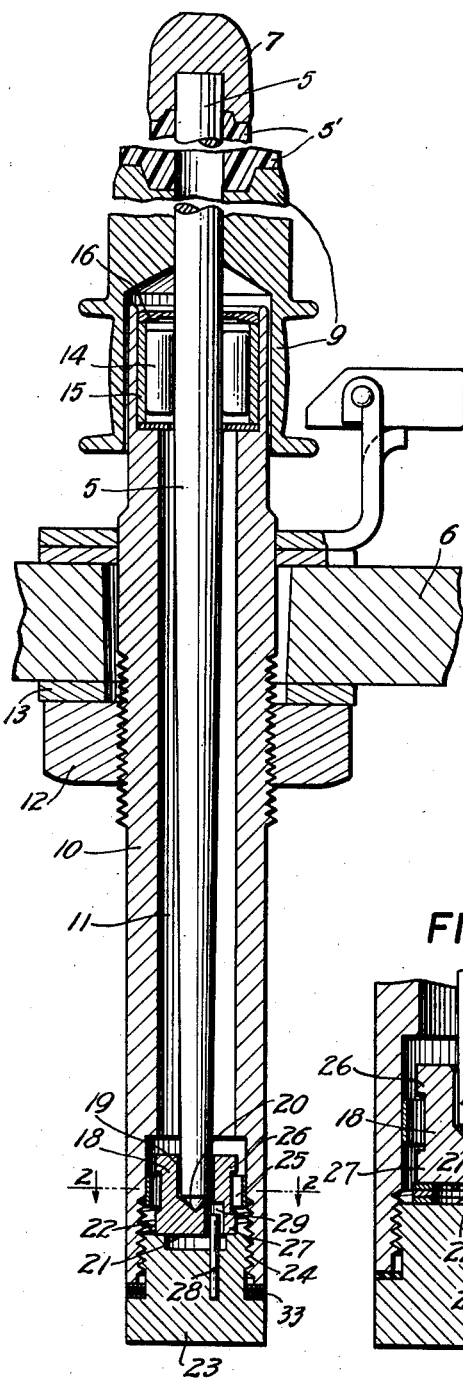
Fig. 1 is a vertical sectional view of a textile spindle in accordance with the invention, and shown mounted on a spinning rail.
Figure 2:
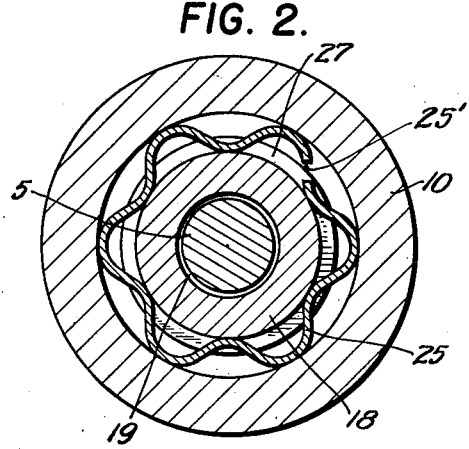
Fig. 2 is an enlarged sectional view taken substantially in the plane 2—2 of Fig. 1.
Figure 3:
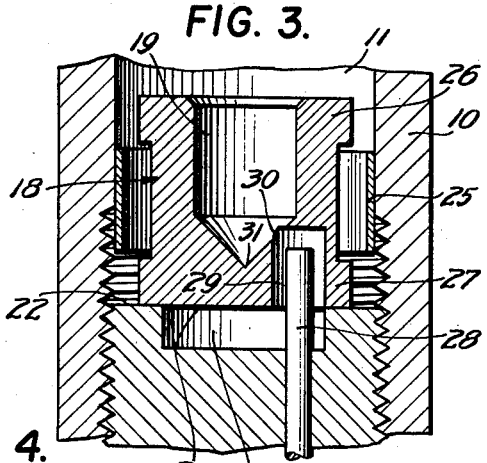
Fig. 3 is an enlarged fragmentary vertical sectional view of the base bearing in Fig. 1.

Referring to Figs. 1, 2, and 3 of the drawings, my invention is shown in application to a vertically mounted textile spindle 5 to be supported on a spinning rail 6. The spindle 5 may include a blade portion, encased for the greater part by a plastic sleeve or sheath 5' and capped, as by a press-fitted head 7; the spindle 5 may be driven by a whorl member 9. The spindle 5 may be revolubly supported between spaced parts of its lower end, and such support may be derived between correspondingly spaced parts of a bolster 10 having a longitudinally extending bore 11 therein. The bolster 10 may be secured to the spinning rail in the conventional manner, as by tightening a nut 12 over a washer 13 against the underside of the rail 6.

As indicated generally above, I employ two spaced bearings to support the spindle 5. One of these bearings may have some self-alignment characteristics with substantially no freedom for radial movement, and the other of these bearings may be permitted radial freedom. In the form shown, the substantially radially fixed bearing is the main or upper bearing. This upper bearing may be a plain bushing or a ball bearing or, as in the form shown, the upper bearing may incorporate rollers 14 as the antifriction elements. In the form shown, the rollers 14 ride directly upon the spindle 5, and a sleeve member 15 press-fitted within a counterbore in the bolster 10 provides the outer raceway. Seal means, such as a disk 16, may serve to close off the bearing means 14 against the entrance of dirt, lint, or other foreign matter. It will be understood that, by virtue of the normal running radial clearance or play in the described main bearing, the said main bearing may be inherently safely capable of limited misalignment of the spindle axis relatively to the axis of sleeve 15; the main-bearing means may thus, for present purposes, be said to be self-aligning.

As indicated, the lower or step bearing may be permitted a certain amount of radial freedom. In the form shown I employ what may be termed a step-bearing member 18, having a bore 19 suitably formed at the lower end thereof to receive the conically formed tip 20 of the spindle 5 and to support the latter essentially in the conventional manner. The underside 21 of the step-bearing member may be substantially flat so as to be slidable on the substantially flat surface 22 which forms the bottom of the bore 11 in the bolster. In the form shown, this flat bottom surface is formed on a bottom-closure member 23, which may be threadedly engaged, as at 24, to the base of the bolster.

As also indicated generally above, I provide means for limiting the extent of radial freedom that is permitted to the step-bearing member 18, thus assuring safe self-aligned operation of the main-bearing means. Such means may include appropriate dimensioning of the radial clearance between the step-bearing member 18 and the bore in the bolster 10, but, in the form shown, I employ resilient means for this purpose. The resilient means may include a member 25 of spring material extending circumferentially within the annular space between the step-bearing member 18 and the bore in the bolster. The spring member 25 may be a continuous ribbon having undulations alternately contacting the step-bearing member 18 and the bolster 10; alternately the spring 25 may be relieved, as at a gap 25', for greater resilient action. If desired, the spring means 25 may be axially located between shoulder means 26—27, defining limits of an annular groove in the step-bearing member 18.

It will be appreciated that such spring construction may urge the step-bearing member 18 normally toward a central position for concentrically positioning the spindle 5 within the bolster 10, and that whatever direction of misalignment the spindle axis may seek to assume, the spring 25 may oppose any given such misalignment with a uniformly consistent restoring force, the force increasing the greater the degree of misalignment. In any case, whether the movement of the step-bearing member 18 is limited by the spring 25 or by abutment of member 18 with the bolster 10, such limiting preferably occurs before the spindle axis has been misaligned to what may be called the safe-operating misalignment limit of the main bearing 14.

In operation, I prefer that the step-bearing member 18 shall not be allowed to rotate, but that it shall be anchored against rotation with respect to the bolster. Such anchoring may be effected by mutual engagement of abutment means carried by the bolster and by the step-bearing member 18, and in the form shown I have employed for this purpose an upwardly projecting eccentric pin or stud 28 carried by the bottom-closure member 23 and projecting into loose engagement with a bore 29 in the underside of the step-bearing member 18.

If desired, the bore 29 may communicate, as at 30, with the bore 19 and, of course, offset from the axis thereof, so that the bore 29 may perform the additional function of providing a passage to receive and carry sludge or excess lubricant away from the spindle bearing point 31 (see Fig. 3) within the bore 19. Also, if desired, a central portion 32 of the bottom-closure member 23 standing preferably beneath the abutment bore 29, may be recessed to form a reservoir for sludge accumulations and to keep such accumulations away from the sliding surfaces 21—22.

Figure 4:
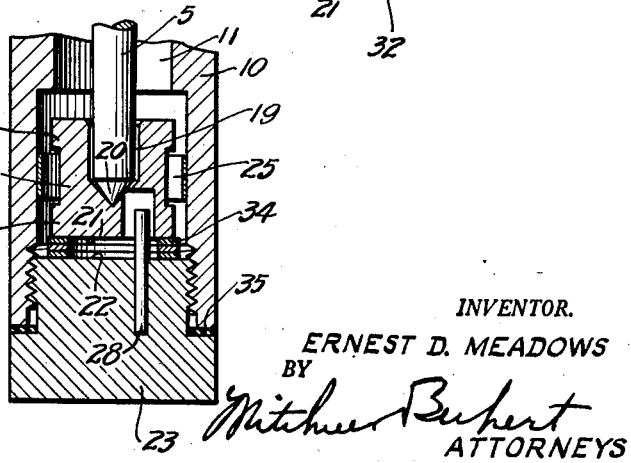
Fig. 4 is a fragmentary vertical sectional view of a base bearing illustrating a modification according to the invention.

In accordance with a further feature of the invention, I provide shim means which may serve adjustably to position the step-bearing member 18, so as to properly axially engage and support the tip 20 of the spindle 5. In the form shown in Fig. 1, such shim means may be in the form of washer laminations 33 seated against a shoulder on the bottom-closure member 23 and driven against the lower end of the bolster body 10. In the form shown in Fig. 4, spacer shims or washers 34 may be interposed between the flat surface 22 on the bottom-closure member 23 and the flat bottom surface 21 of the step-bearing member 18. Incidentally, in connection with the arrangement of Fig. 4, it will be noted that a resilient gasket 35, preferably of oil-resistant rubber or rubber-like material, may be seated between the shoulder of the bottom-closure member 23 and the base of the bolster 10. It will be appreciated that such gasket member 35 may not only effectively seal the bottom of the bolster against egress of lubricant, but because of its resilient properties, it may also permit slight freedom for axial preloading adjustment of the step-bearing member 18 relatively to the spindle 5.

It will be appreciated that I have described a relatively simple bearing suspension for a spindle. This bearing suspension may permit a limited degree of resiliently opposed misalignment of the spindle so as to permit assumption by the spindle of a slightly misaligned axis of rotation in the presence of slight eccentric loads.

While my invention has been described in considerable detail and preferred forms shown, it will be appreciated that embodiments may be made within the scope of the invention as defined by the following claim.

I claim:

In a device of the character indicated, a bolster having a bore therethrough and a counterbore at the bottom, a blade extending into said bolster, a bearing at the upper end of said bolster bore to sustain said blade radially, a closure for the bottom of said bolster comprising a closure member threadedly engaged with said bolster counterbore and having a part projecting up into said bolster counterbore, a step bearing block in said bolster counterbore supported by said closure member, and being of a diameter to be removable and insertable through the lower end of the bolster counterbore when the closure is removed, said bearing block having a groove providing an upwardly facing radial shoulder surface, resilient means about said bearing block and engaging the wall of said counterbore and engageable with said shoulder to limit upward movement of said bearing block to confine the same in said counterbore, said bearing block having an axial bore in the top thereof and terminating in a generally conical bearing surface for the lower end of the blade, said closure member having an eccentrically located vertical bore in the top thereof, said bearing block having a vertical eccentrically located bore in the bottom thereof and intersecting said generally conical bearing surface, and a pin projecting into the vertical bore in the closure member and into the vertical bore in the bottom of the step bearing block to hold said bearing block against rotation in the bolster.

ERNEST D. MEADOWS.

References Cited in the file of this patent

UNITED STATES PATENTS

| Number | Name | Date |
|--------|------|------|
| 602,110 | Rushworth | Apr. 12, 1898 |
| 905,845 | Christenson | Dec. 8, 1908 |
| 2,168,247 | Staufert | Aug. 1, 1939 |
| 2,350,272 | Cobb | May 30, 1944 |
| 2,351,951 | Gleitz | June 20, 1944 |
| 2,417,485 | Gleitz | Mar. 18, 1947 |
| 2,486,296 | Laird | Oct. 25, 1949 |

FOREIGN PATENTS

| Number | Country | Date |
|--------|---------|------|
| 21,891 | Great Britain | Jan. 19, 1911 |